May 29, 1951   R. M. RIBLET   2,554,957
ROLLER BEARING CUP SPACER
Filed Sept. 28, 1946

INVENTO
Robert M. Riblet,
BY Carr Carr Gravely,
HIS ATTORNEYS.

Patented May 29, 1951

2,554,957

UNITED STATES PATENT OFFICE 2,554,957

ROLLER BEARING CUP SPACER

Robert M. Riblet, Canton, Ohio, assignor to The Timken Roller Bearing Company, Canton, Ohio, a corporation of Ohio Application September 28, 1946, Serial No. 700,001

2 Claims. (Cl. 85—51)

This invention relates to roller bearings of the type comprising two sets of rollers, separate outer bearing members therefor, a C-shaped spacing washer between the opposed ends of said outer bearing members and means cooperating with said spacing washer for holding it in place. The invention has for its principal object to provide a bearing of the above type with simple and economical quick attachable and detachable means for holding the C-shaped spacing washer in place. The invention consists in the double row roller bearing and two part spacing means therefor and in the parts and combinations and arrangements of parts hereinafter described and claimed.

Figure 1:
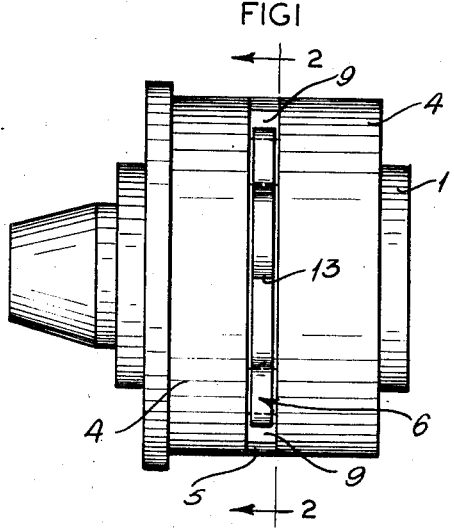
Figure 2:
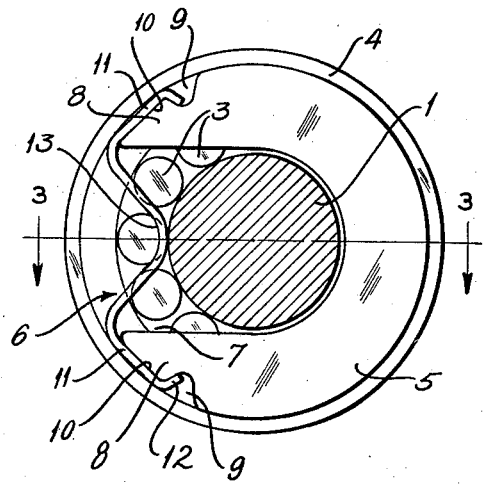
Figure 3:
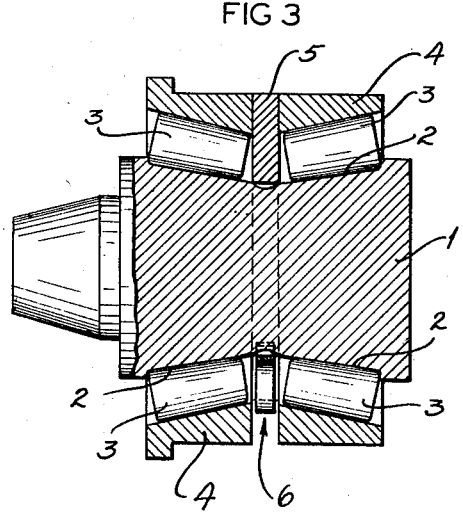
Figure 4:
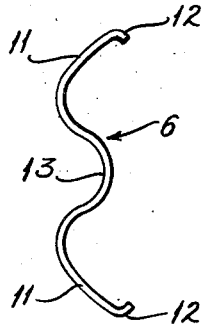

In the accompanying drawing, which forms part of this specification and wherein like symbols refer to like parts wherever they occur, Fig. 1 is a side elevational view of a double row roller bearing construction embodying my invention, Fig. 2 is a cross-sectional view on the line 2—2 in Fig. 1, Fig. 3 is a central longitudinal sectional view on the line 3—3 in Fig. 2; and Fig. 4 is an edge view of the detachable retaining clip.

In the accompanying drawing my invention is shown embodied in a double row tapered roller bearing comprising a double inner bearing member or cone 1 having conical raceway portions 2' thereon that taper toward the middle of the bearing, a circular series of conical rollers 3 mounted on each raceway and a separate cup or outer bearing member 4 for each series of rollers. The present invention is concerned with a two part spacer that is interposed between the opposed ends of the bearing cups 4 for holding them in proper running position.

The two part spacer comprises a C-washer 5 and a spring retaining member or clip 6 therefor. The C-shaped spacing and positioning washer 5 comprises an annular body having an opening 7 through one side thereof, so as to permit the washer to be inserted over the inner bearing member. The opening 7 has substantially straight parallel sides defined by jaws 8; and the outer side edges of said jaws have notches 9 therein, while the ends of said jaws are inclined, as at 10, at diverging angles from their inner side edges to said notches. The spring retaining member or clip 6 of the two part spacer comprises an elongated spring plate which is of less width than the thickness of the C-washer 5 and has diverging end portions 11, which terminate in inturned hooks 12, and a bowed or laterally offset intermediate portion 13 disposed between the hooked diverging end portions.

The retainer 6 is attached to the C-shaped washer 5 by positioning the retainer crosswise of the opening 7 at the mouth thereof with its hooked ends seated on the beveled outer ends 10 of the jaws 8 and with its bowed intermediate portion 13 extending part way into said opening. The spring retainer 6 is then pressed against the C-washer with a force sufficient to cause the hooked ends 12 of the retainer to ride along the inclined end faces 10 of the jaws 8 and spread apart and snap into the notches or recesses 9 in the outer side edges of said jaws, thus firmly holding said retainer in place on said washer. In this position of the parts, the hooked ends 12 of the retainer are resiliently seated in the peripheral notches 9 of the C-washer 5, the diverging end portions 11 of the retainer seat flatwise on the beveled ends 10 of the jaws 8 of the washer and the bowed intermediate portion 13 of the retainer is disposed in the opening 7 of said washer with its crest or apex disposed closely adjacent to but clear of the inner bearing member 1. The spring retainer may be released by an outward pull thereon sufficient to disengage the hooked end portions 12 thereof from the notches 9 in the C-washer.

By the arrangement described, the C-shaped washer is quickly and easily locked in place around the inner bearing member 1 and between the opposed ends of the outer bearing members 4 merely by snapping the hooked ends of the spring retainer over the outer ends of the jaws 8 of said washer. In this position of the retainer, the inwardly bowed intermediate portion 13 thereof is disposed substantially entirely within the mouth of the opening 7 in the C-washer with the apex of said bowed portion close enough to the inner bearing member 1 to loosely centralize the spacing washer in the bearing. Any outward pressure on the apex of said bowed intermediate portion 13 of the retainer tends to tighten the hooked ends 12 thereof in the notches 8 in the C-washer. The retainer is made of a spring steel stamping and is readily bent into shape. The retainer is narrower than the thickness of the C-washer, thus providing spaces for the flow of lubricant. The end portions of the retainer are confined between the opposing end faces of the bearing cups 4, whereby the retainer is prevented from moving out of position laterally and interfering with the rollers and the action of the bearing.

What I claim is:

1. A two part roller bearing cup spacer comprising a flat rigid body in the form of an annulus with a central circular aperture formed with an opening through one side, the sides of said body opening constituting jaws freely passing at opposite sides of a body received in the central aperture of said annular body, and a flat thin section spring retainer for said flat body formed to provide an intermediate bowed portion lying in the plane of said flat body with said bowed portion across said jaw opening adjacent the body in the central aperture thereof and opposite end portions in gripping contact with the periphery of said flat body outwardly of said jaw opening.

2. The spacer set forth in claim 1 wherein said jaws are provided with flat peripheral faces adjacent the jaw opening and V-shaped notches spaced from said jaw opening at the outer ends of said flat faces, and said spring retainer is further formed with flat end portions lying on said flat faces and hook elements at the ends adapted to snap into the V-shaped notches.

ROBERT M. RIBLET.

REFERENCES CITED

The following references are of record in the file of this patent:

UNITED STATES PATENTS

| Number | Name | Date |
|---|---|---|
| 1,452,165 | Michael | Apr. 17, 1923 |
| 2,178,843 | Slusser | Nov. 7, 1939 |
| 2,192,165 | Caldwell | Feb. 27, 1940 |
| 2,418,095 | Riblet | Mar. 25, 1947 |